(12) United States Patent
Rawlinson et al.

(10) Patent No.: US 9,997,812 B2
(45) Date of Patent: Jun. 12, 2018

(54) EV BATTERY PACK COOLING SYSTEM

(71) Applicant: Atieva, Inc., Menlo Park, CA (US)

(72) Inventors: Peter Dore Rawlinson, Worcestershire (GB); Nathaniel Wynn, San Mateo, CA (US); John Louis D'Atri, Redwood City, CA (US)

(73) Assignee: ATIEVA, INC., Menlo Park, CA (US)

( * ) Notice: Subject to any disclaimer, the term of this patent is extended or adjusted under 35 U.S.C. 154(b) by 191 days.

(21) Appl. No.: 15/040,259

(22) Filed: Feb. 10, 2016

(65) Prior Publication Data

US 2017/0229749 A1  Aug. 10, 2017

Related U.S. Application Data

(63) Continuation-in-part of application No. 15/040,204, filed on Feb. 10, 2016, now Pat. No. 9,923,251.

(51) Int. Cl.
*H01M 10/6568* (2014.01)
*H01M 10/613* (2014.01)
*H01M 10/625* (2014.01)
*H01M 10/6551* (2014.01)

(52) U.S. Cl.
CPC ..... *H01M 10/6568* (2015.04); *H01M 10/613* (2015.04); *H01M 10/625* (2015.04); *H01M 10/6551* (2015.04); *H01M 2220/20* (2013.01)

(58) Field of Classification Search
CPC ......... H01M 10/6568; H01M 10/613; H01M 10/625; H01M 10/6551
See application file for complete search history.

(56) References Cited

U.S. PATENT DOCUMENTS

| | | | |
|---|---|---|---|
| 9,780,421 B2 | 10/2017 | Palanchon | |
| 2007/0178377 A1* | 8/2007 | Kim | H01M 2/021 429/152 |
| 2010/0119927 A1* | 5/2010 | Bauer | H01M 2/1083 429/120 |
| 2015/0198372 A1* | 7/2015 | Desikan | F28D 1/0366 165/151 |
| 2017/0069940 A1* | 3/2017 | Goldstein | H01M 2/24 |

* cited by examiner

*Primary Examiner* — Mark F. Huff
*Assistant Examiner* — Monique M Wills
(74) *Attorney, Agent, or Firm* — Patent Law Office of David G Beck

(57) ABSTRACT

A battery pack thermal management assembly is provided for use with an electric vehicle in which the battery pack is sealed and mounted under the car. The batteries contained within the battery pack are thermally coupled via a layer of thermally conductive material to the interior surface of the pack's upper enclosure panel. A secondary panel is thermally coupled to the pack's upper enclosure panel. A shaped conduit panel is attached to the secondary panel. A cooling panel structure containing a coolant channel is defined by the surface of the secondary panel and the conduit panel's interior surface.

29 Claims, 9 Drawing Sheets

EV BATTERY PACK COOLING SYSTEM

CROSS-REFERENCE TO RELATED APPLICATION

This application is a continuation-in-part of U.S. patent application Ser. No. 15/040,204, filed 10 Jan. 2016, the disclosure of which is incorporated herein by reference for any and all purposes.

FIELD OF THE INVENTION

The present invention relates generally to battery packs and, more particularly, to a system for maintaining battery pack temperature while minimizing the risks to passengers in the event of one or more of the batteries within the battery pack entering into thermal runaway.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, contained within a laptop computer or utilized in a vehicle, catching on fire. As a result, one of the primary issues impacting consumer confidence with respect to both hybrid and all-electric vehicles is the risk of a battery pack fire.

Rechargeable batteries, due to their chemistries, tend to be relatively unstable and prone to thermal runaway, an event that occurs when a battery's internal reaction rate increases to such an extent that it is generating more heat than can be withdrawn. If reaction rate and heat generation go unabated, eventually the heat generated becomes great enough to cause the battery and materials in proximity to the battery to combust. Thermal runaway may be the result of a battery short, for example a short due to a leak within an internal battery pack cooling system. Thermal runaway may also be caused by a manufacturing defect, improper cell use, exposure to extreme temperatures, or damage such as that which may be sustained during an accident or when road debris dents or punctures the battery pack.

Although the prior art discloses numerous techniques for cooling the battery pack of an electric vehicle, a thermal management system is needed that is both cost effective and capable of maintaining the batteries within their desired operating temperature range while minimizing the risks to the vehicle's passengers. The present invention provides such a system.

SUMMARY OF THE INVENTION

The present invention provides a battery pack thermal management assembly comprising (i) a plurality of batteries, where a first end portion of each battery includes both a first terminal and a second terminal; (ii) a sealed battery pack enclosure configured to contain the plurality of batteries, the sealed battery pack enclosure comprising a lower enclosure panel, a plurality of enclosure side panels, and an upper enclosure panel, and where the upper enclosure panel is comprised of a thermally conductive material; (iii) a secondary panel, where a first surface of the secondary panel is proximate to an external surface of the upper enclosure panel, where the secondary panel is thermally coupled to the upper enclosure panel, and where the secondary panel is attached to the upper enclosure panel; (iv) a conduit panel, where at least a portion of the conduit panel in cross-section exhibits a corrugated structure, where the corrugated structure is comprised of a plurality of mounting surfaces and a plurality of channels, where the conduit panel is attached to a second surface of the secondary panel at a plurality of attachment junctures, where at least a portion of the plurality of attachment junctures are formed between the second surface of the secondary panel and the plurality of mounting surfaces, where the plurality of attachment junctures form a coolant channel seal, where the conduit panel and the secondary panel form a cooling panel structure, where the cooling panel structure comprises a coolant channel, and where the coolant channel is defined by the second surface of said secondary panel and an inner surface of the plurality of channels of the corrugated structure of the conduit panel; and (v) a layer of thermally conductive material, where the layer of thermally conductive material is electrically insulative, where the layer of thermally conductive material contacts and is thermally coupled to at least an upper surface of each battery of the plurality of batteries, where the upper surface of each battery is distal from the first end portion of each battery, and where the layer of thermally conductive material is interposed between the upper surface of each battery of the plurality of batteries and an internal surface of the upper enclosure panel. The assembly may further include a heat transfer medium contained within the coolant channel and a circulation pump configured to pump the heat transfer medium through the coolant channel.

In one aspect, the cooling panel structure may be attached to the upper enclosure panel using a temporary means of attachment such as bolts or clips. Alternately, the cooling panel structure may be attached to the upper enclosure panel using a technique selected from welding, brazing, soldering and bonding.

In another aspect, the assembly may further include a layer of a thermal compound interposed between the first surface of the secondary panel and the external surface of the upper enclosure panel, where the thermal compound may be selected from the group consisting of thermal greases, thermal pastes and thermal gels.

In another aspect, the sealed battery pack may be mounted to a vehicle and positioned such that the first end portion of each battery is in close proximity to the lower enclosure panel, which in turn is adjacent to the road surface, and where the upper surface of each battery is in close proximity to the internal surface of the upper enclosure panel. Preferably the batteries utilize a cylindrical form factor (e.g., 18650 form factor) and are positioned within the battery pack such that the cylindrical axis corresponding to each battery is substantially perpendicular to the lower enclosure panel. In this configuration the coolant channel is positioned such that the coolant within the coolant channel will flow within a plane that is substantially perpendicular to the cylindrical axis of each battery.

In another aspect, the plurality of attachment junctures may be fabricated using a technique such as welding, brazing, soldering or bonding, thus creating a juncture comprised of a weld joint, braze joint, solder joint or bond joint.

In another aspect, the layer of thermally conductive material may be discontinuous and comprised of a plurality of thermally conductive material regions corresponding to the plurality of batteries.

In another aspect, the layer of thermally conductive material may be configured to contact and be thermally coupled to a second end portion of each battery of the plurality of batteries, where the second end portion of each battery is distal from the first end portion of each battery.

In another aspect, the layer of thermally conductive material preferably has a resistivity of at least $10^{12}$ ohm-cm and a thermal conductivity of at least 0.25 $Wm^{-1}K^{-1}$, and more preferably a resistivity of at least $10^{12}$ ohm-cm and a thermal conductivity of at least 0.75 $Wm^{-1}K^{-1}$. The layer of thermally conductive material may be comprised of an epoxy.

In another aspect, a plurality of granules may be dispersed throughout the layer of thermally conductive material, where the granules have a melting point that is higher than the melting point of the layer of thermally conductive material.

In another aspect, the upper enclosure panel, which is preferably flat, may be fabricated from a metal such as aluminum or an iron alloy (e.g., carbon steel, stainless steel, etc.). Preferably the upper enclosure panel has a thermal conductivity of at least 15 $Wm^{-1}K^{-1}$, more preferably at least 40 $Wm^{-1}K^{-1}$, and still more preferably at least 100 $Wm^{-1}K^{-1}$.

In another aspect, the secondary panel, which is preferably flat, may be fabricated from a metal such as aluminum or an iron alloy (e.g., carbon steel, stainless steel, etc.). Preferably the secondary panel has a thermal conductivity of at least 15 $Wm^{-1}K^{-1}$, more preferably at least 40 $Wm^{-1}K^{-1}$, and still more preferably at least 100 $Wm^{-1}K^{-1}$.

In another aspect, the conduit panel may be fabricated from a metal such as aluminum or an iron alloy (e.g., carbon steel, stainless steel, etc.).

In another aspect, the inner surface of the upper enclosure panel may be coated with an isolation layer comprised of an electrically non-conductive material. For example, if the upper enclosure panel is fabricated from aluminum the inner surface may be anodized.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

In a conventional EV with a large battery pack, such as that typically required for an all-electric vehicle or a PHEV with a relatively long electric-only range, the battery pack is normally mounted under the vehicle, and thus at least partially under the vehicle's passenger cabin. This mounting location is generally considered to be optimal, both from a packaging point of view in terms of minimizing the impact on the passenger and luggage compartments as well as from a vehicle performance point of view in terms of providing a low center of gravity and a desirable weight distribution. The typical undercarriage configuration described above is illustrated in FIG. 1 which shows a battery pack 101 configured to be mounted from below, following direction 103, into vehicle chassis 105. Once mounted, battery pack 101 traverses the width of the vehicle and extends substantially between the front and rear suspension assemblies.

Figure 1:
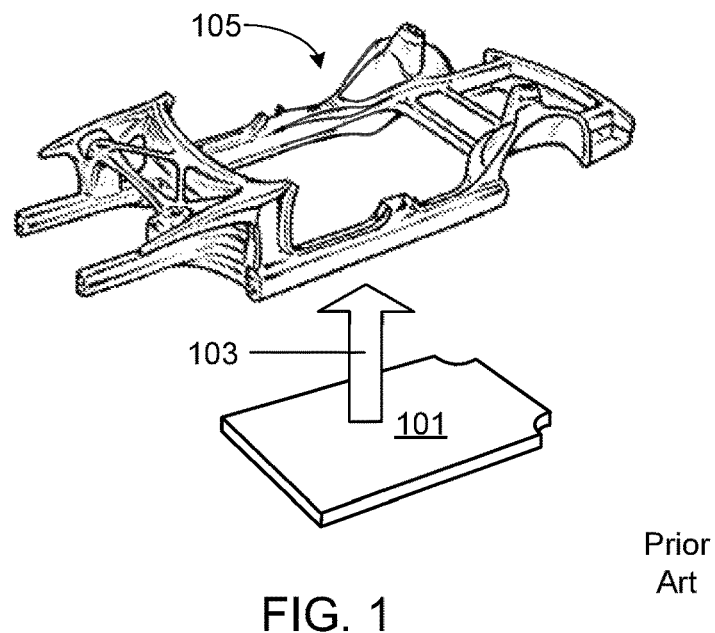
FIG. 1 provides a perspective view of a battery pack and the vehicle chassis to which it is to be mounted.
Figure 2:
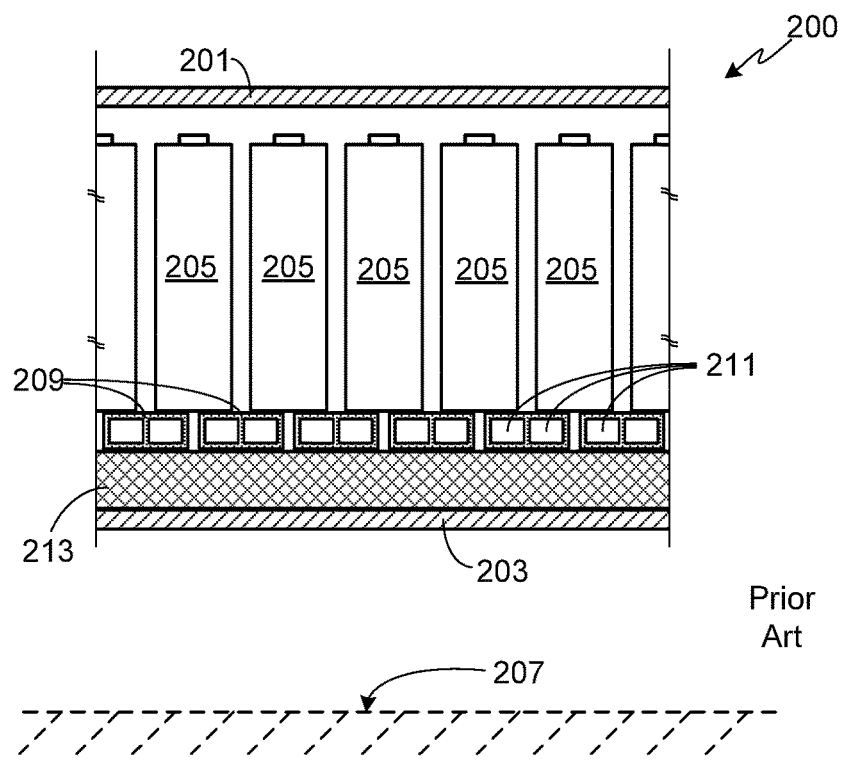
FIG. 2 provides a cross-sectional view of a portion of an exemplary battery pack in accordance with the prior art.
Figure 3:
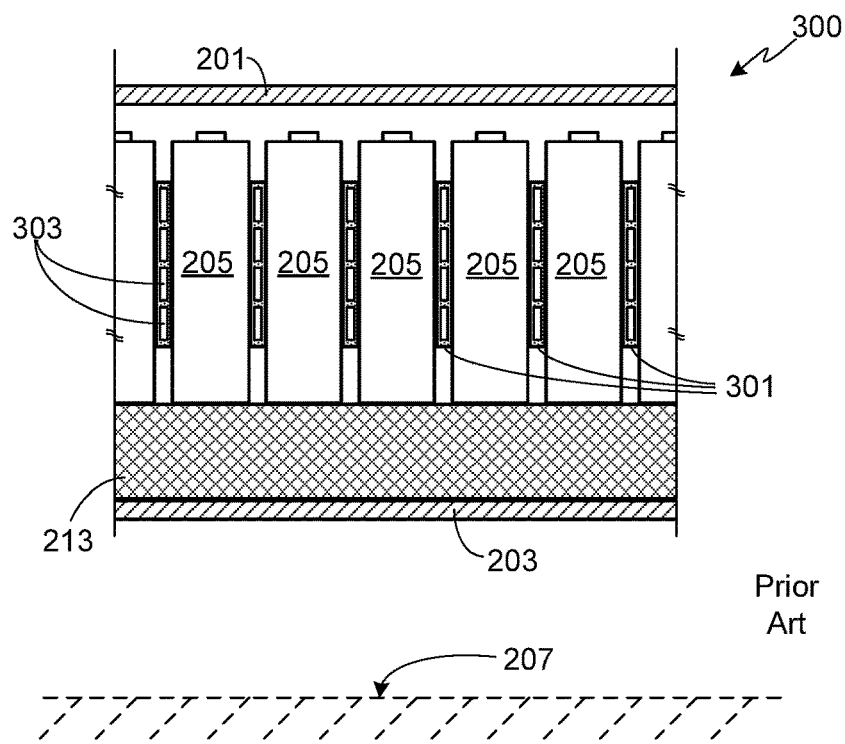
FIG. 3 provides a cross-sectional view of a portion of an alternate battery pack configuration in accordance with the prior art.

FIGS. 2 and 3 provide cross-sectional views of exemplary battery configurations suitable for use in a battery pack such as that shown in FIG. 1. For purposes of clarity, battery interconnects and battery mounts are not included in either of these figures. Visible in FIGS. 2 and 3 is a portion of the upper battery pack enclosure panel 201, a portion of the lower battery pack enclosure panel 203, and a plurality of batteries 205. Note that the enclosure side panels are not visible in this view. Batteries 205 shown in these exemplary configurations utilize an 18650 form-factor and are positioned such that the axis of each battery, i.e. the cylindrical axis, is substantially perpendicular to both lower enclosure panel 203 and surface 207 of the road. In battery pack configuration 200, interposed between the base of each cylindrical battery 205 and lower panel 203 are a plurality of cooling conduits 209 through which a liquid coolant, i.e., a heat transfer medium, is pumped. Alternately, and as illustrated in battery pack configuration 300, cooling conduits 301 are interposed between the sides of adjacent batteries 205. In both of the illustrated configurations, the cooling conduits are aligned with lower panel 203, resulting in the coolant within channels 211/301 flowing in a direction substantially perpendicular to the axes of the cylindrical batteries. By regulating the flow of coolant within conduits 209/301 and/or regulating the transfer of heat from the coolant to another temperature control system, the temperature of cells 205 may be regulated so that the cells remain within their preferred operating range. In the illustrated configurations, one or more thermally insulating layers 213 are interposed between the batteries/cooling conduits and the battery pack, thereby providing a means for limiting the unintentional transfer of thermal energy between the batteries/cooling conduits and the battery pack enclosure. Thermally insulating layer(s) 213 may be comprised of air or some other thermally insulating material.

Figure 4:
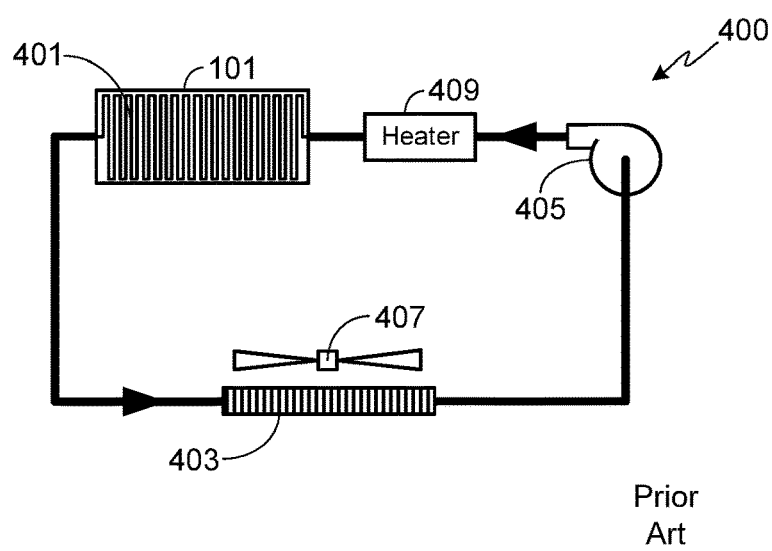
FIG. 4 illustrates an exemplary battery pack cooling system in accordance with the prior art.

FIG. 4 illustrates an exemplary battery thermal management system 400 suitable for use with a battery pack such as that described herein. In system 400, the temperature of the batteries within battery pack 101 is controlled by pumping a thermal transfer medium, e.g., a liquid coolant, through a plurality of battery cooling conduits 401. Cooling conduits may be integrated into battery pack 101 as described above relative to FIGS. 2 and 3, or coupled to an exterior surface of battery pack 101 as described below relative to the present invention. Conduits 401, which are in thermal communication with the batteries within pack 101, provide a means of controlling the temperature of the batteries by regulating the flow of coolant within conduits 401 and/or regulating the transfer of heat from the coolant to another temperature control system. In the embodiment illustrated in FIG. 4, the coolant within conduits 401 is pumped through a radiator 403 using a pump 405. A blower fan 407 may be used to force air through radiator 403, for example when the car is stationary or moving at low speeds, thus insuring that there is an adequate transfer of thermal energy from the coolant to the ambient environment. System 400 may also include a heater 409, e.g., a PTC heater, that may be used to heat the coolant within conduits 401, and thus heat the batteries within pack 101. Battery heating via a supplemental heat source 409 or by coupling the battery pack coolant loop to various drive train components (e.g., motor, power inverter, transmission, etc.) may be necessary to maintain battery temperature within the desired operating range, for example when the ambient temperature is too low or during initial vehicle operation.

Figure 5:
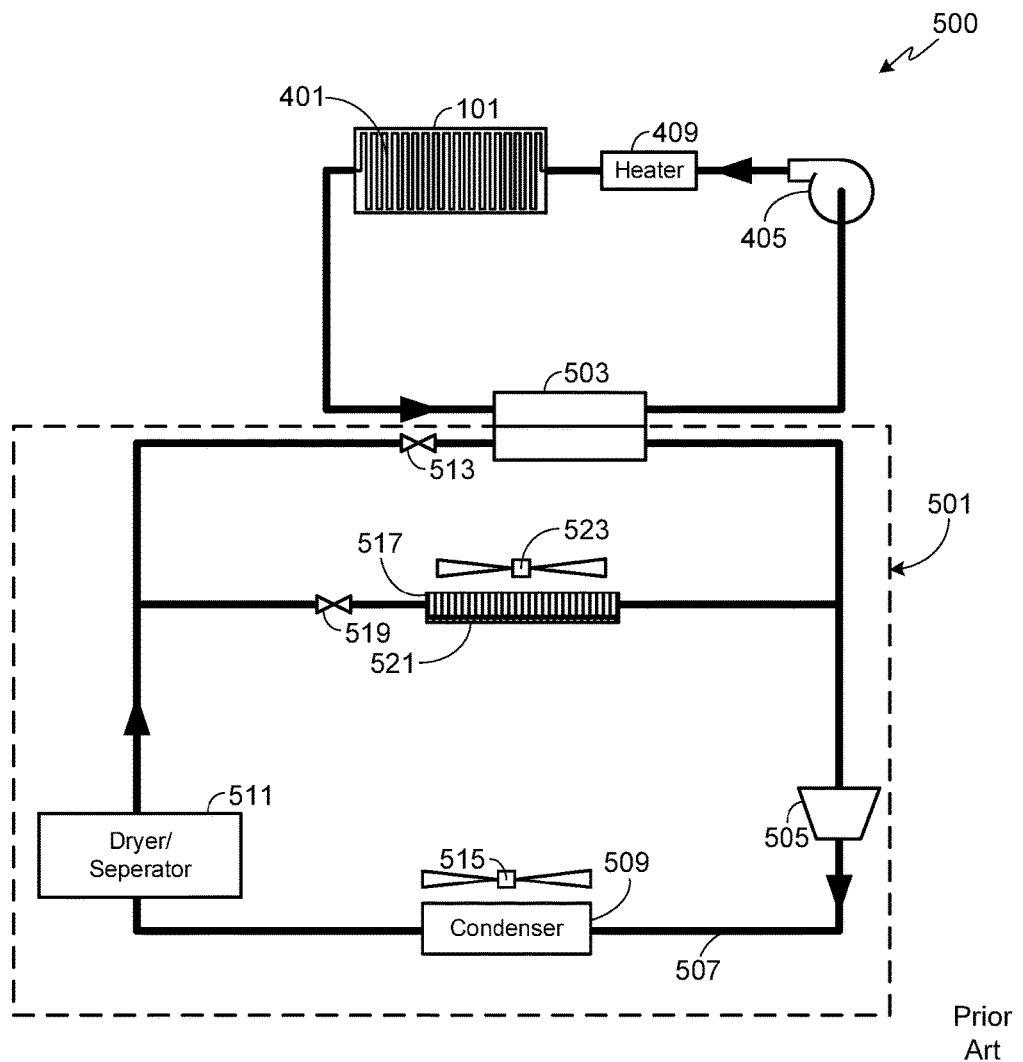
FIG. 5 illustrates an alternate battery pack cooling system in accordance with the prior art.

FIG. 5 illustrates an alternate battery pack thermal management system 500 also applicable to the battery pack cooling system of the present invention. In system 500 the coolant within conduits 401 is coupled to a secondary thermal management system 501 via a heat exchanger 503. Preferably thermal management system 501 is a refrigeration system and as such, includes a compressor 505 to compress the low temperature vapor in refrigerant line 507 into a high temperature vapor and a condenser 509 in which a portion of the captured heat is dissipated. After passing through condenser 509, the refrigerant changes phases from vapor to liquid, the liquid remaining at a temperature below the saturation temperature at the prevailing pressure. The refrigerant then passes through a dryer 511 that removes moisture from the condensed refrigerant. After dryer 511, refrigerant line 507 is coupled to heat exchanger 503 via thermal expansion valve 513 which controls the flow rate of refrigerant into heat exchanger 503. Additionally, in the illustrated system a blower fan 515 is used in conjunction with condenser 509 to improve system efficiency.

In a typical vehicle configuration, thermal management system 501 is also coupled to the vehicle's heating, ventilation and air conditioning (HVAC) system. In such a system, in addition to coupling refrigerant line 507 to heat exchanger 503, line 507 may also be coupled to the HVAC evaporator 517. A thermal expansion valve 519 is preferably used to control refrigerant flow rate into the evaporator. A heater, for example a PCT heater 521 integrated into evaporator 517, may be used to provide warm air to the passenger cabin. In a conventional HVAC system, one or more fans 523 are used to circulate air throughout the passenger cabin, where the circulating air may be ambient air, air cooled via evaporator 517, or air heated by heater 521.

Figure 6:
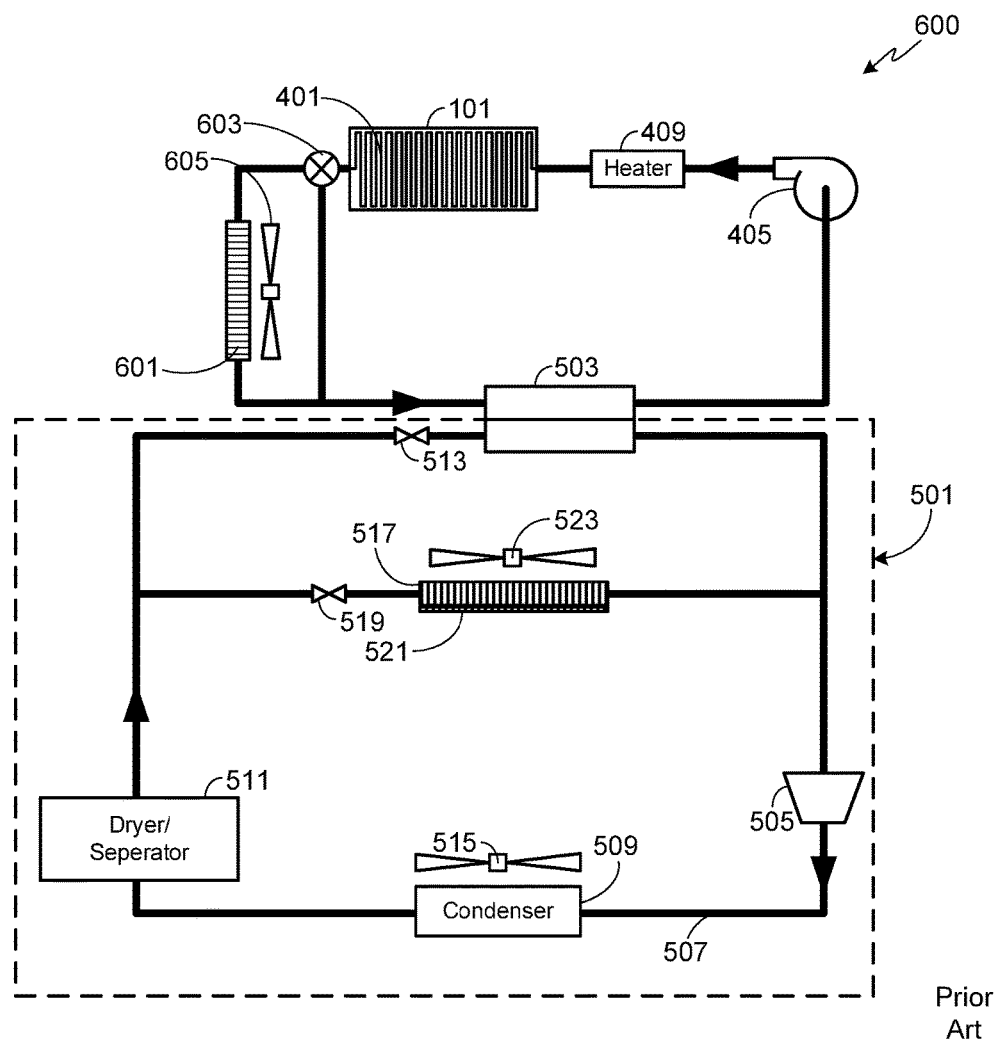
FIG. 6 illustrates an alternate battery pack cooling system in accordance with the prior art, the illustrated system utilizing both a radiator and a heat exchanger as described relative to FIGS. 4 and 5, respectively.
Figure 7:
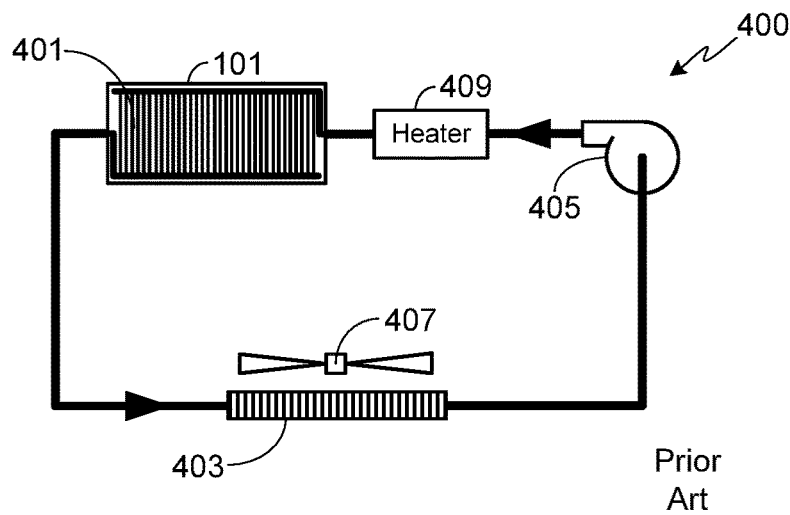
FIG. 7 illustrates the exemplary cooling system shown in FIG. 4 with a different coolant conduit configuration within the battery pack.

In some electric vehicles, battery pack cooling is accomplished using a combination of a radiator such as that shown in FIG. 4, and a heat exchanger such as that shown in FIG. 5. FIG. 6 illustrates such a cooling system. In system 600, the coolant passing through battery pack 101 via conduits 401 may be directed through either radiator 601 or heat exchanger 503. Valve 603 controls the flow of coolant through radiator 601. Preferably a blower fan 605 is included in system 600 as shown, thus providing means for forcing air through the radiator when necessary, for example when the car is stationary. Note that it should be understood that the cooling conduit configuration for battery pack 101 shown in FIGS. 4-6 is only for illustration purposes and that these thermal management systems are equally applicable to other configurations. For example, FIG. 7 shows the cooling system of FIG. 4 with a different conduit configuration within battery pack 101, one utilizing coolant manifolds.

While conventional battery pack cooling conduits such as those shown in FIGS. 2 and 3 provide a means for maintaining battery temperature within a desired range, due to their integration within the confines of the battery pack they present a number of risks and limitations. First, due to their inclusion within the battery pack, battery pack complexity is significantly increased, affecting both manufacturing time and cost. Second, due to pack complexity, if a leak occurs within the integrated coolant conduits repair may be exceedingly difficult and costly, potentially requiring pack or module replacement. Third, if the coolant is electrically conductive, even a minor leak can lead to catastrophic damage due to the leaking coolant creating a battery short. As noted above, a battery short can lead to a thermal runaway event, potentially destroying not only the battery pack but also the entire vehicle, property near the vehicle (e.g., garage and/or house), and risking the health and welfare of the vehicle's passengers. Fourth, a leak of even non-electrically conductive coolant within the battery pack can damage sensitive interconnects and other pack components, resulting in costly repairs and in some instances requiring the complete replacement of the damaged pack or module.

Figure 8:
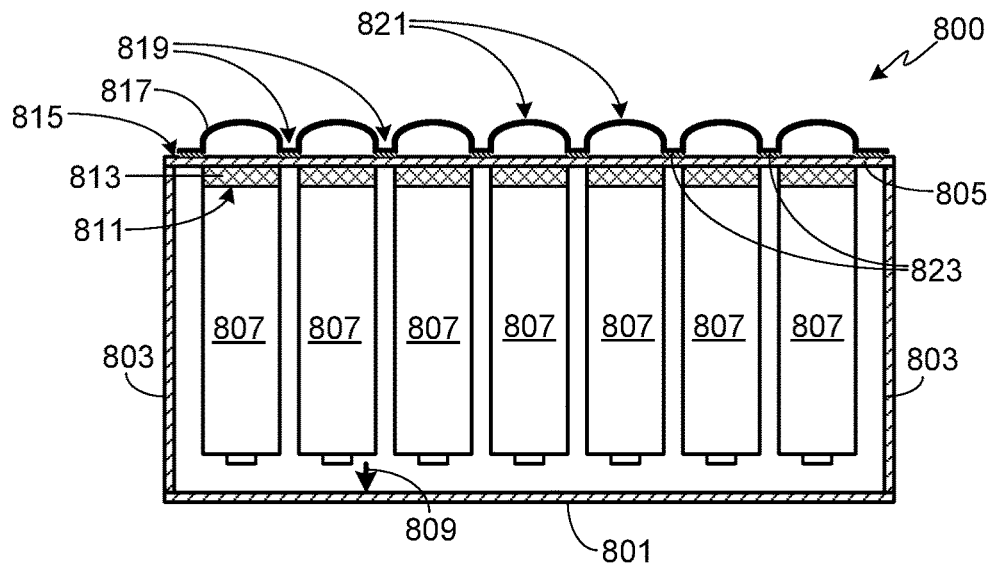
FIG. 8 provides a cross-sectional view of a preferred embodiment of the invention.
Figure 8:
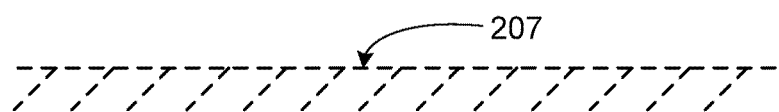

In order to overcome the limitations inherent in a battery pack thermal management system in which the cooling conduits are integrated into the battery pack, the present inventors utilize cooling conduits that are external to the pack. FIG. 8 provides a cross-sectional view of an exemplary battery pack 800 configured in accordance with a preferred embodiment of the invention. Battery pack 800, which does not incorporate cooling conduits within the pack, includes a lower enclosure panel 801, side panels 803 and an upper enclosure panel 805. Contained within pack 800 is a plurality of batteries 807, preferably cylindrical batteries utilizing an 18650 form factor. Batteries 807 are positioned within the battery pack such that the cylindrical axis of each cell is substantially perpendicular to the upper and lower battery pack enclosure panels and where the cap assembly of each of the batteries is adjacent to lower enclosure panel 801. It should be understood that FIG. 8 is simply intended to illustrate the invention, and that a battery pack in accordance with the invention may include more or less batteries than shown.

Rechargeable batteries often incorporate a variety of protection mechanisms into the battery's cap assembly, mechanisms such as a positive temperature coefficient current limiter and a current interrupt device. In addition, the cap assembly typically includes a venting mechanism that is designed to rupture at high pressures, thereby providing a pathway for gas and other materials to escape the confines of the battery casing. In general, the venting mechanism directs the flow of gas and material during a thermal runaway event out through the cap assembly and in a direction that is substantially parallel to the batteries cylindrical axis. Accordingly, during a thermal runaway event batteries 807 will generally direct the flow of hot gas and other materials downward in a direction 809 towards the road surface 207, and thus away from the passenger cabin which is situated above the battery pack.

Figure 9:
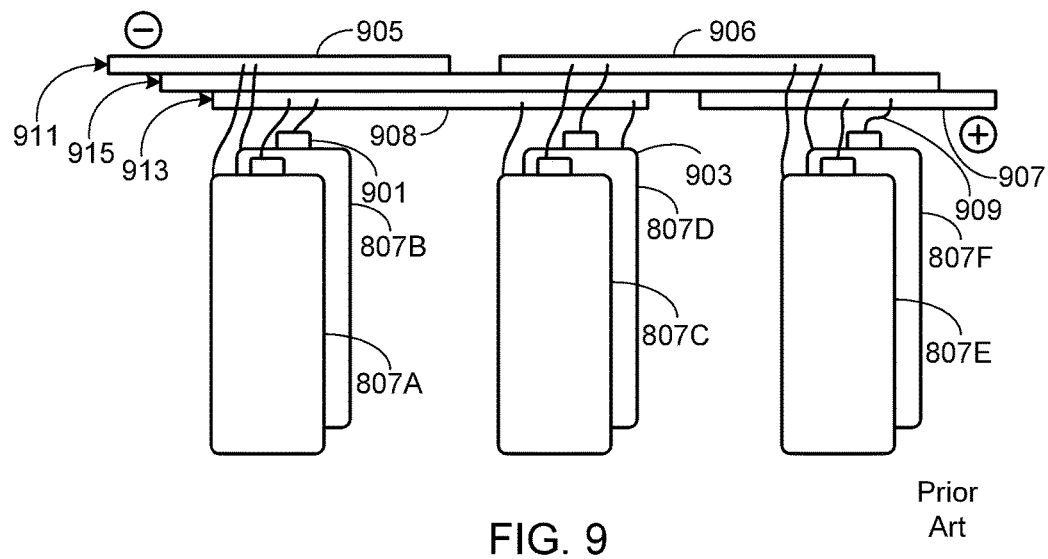
FIG. 9 provides a schematic diagram of a simplified battery pack configuration in which the bus bars are only adjacent to one end of the batteries.

In the battery pack of the invention, the bus bars are all located at one end of the batteries, thereby simplifying pack fabrication and allowing heat removal from the other end of each of the batteries. FIG. 9 provides a simplified view of such an interconnect configuration. As shown, the positive battery terminals (e.g., nub 901 projecting from the cap assembly) and the negative battery terminals (e.g., the battery casing 903) are coupled to bus bars 905-908 using battery interconnects 909 (e.g., wire bonds). In particular, bus bars 905 and 908 couple the first group of batteries 807A and 807B in parallel, bus bars 908 and 906 couple the second group of batteries 807C and 807D in parallel, and bus bars 906 and 907 couple the third group of batteries 807E and 807F in parallel. Series connections between battery groups are formed by the bus bars, specifically the second bus bar 908 connects the positive terminals of the first group of batteries 807A and 807B to the negative terminals of the second group of batteries 807C and 807D, and the third bus bar 906 connects the positive terminals of the second group of batteries 807C and 807D to the negative terminals of the third group of batteries 807E and 807F. In the illustrated bus bar stacking arrangement, first bus bar 905 and third bus bar 906, which are separated by an air gap or other electrical insulator to prevent short circuiting, are placed in a first layer 911; similarly, second bus bar 908 and fourth bus bar 907, which are also separated by a gap or insulator, are placed in a third layer 913. Disposed between layers 911 and 913 is an electrically insulating layer 915.

As noted above, the present invention relies on a battery interconnect configuration in which all battery/bus bar connections are made at one end of the batteries, preferably the lower end of the batteries, thus freeing up the upper end of each of the batteries for heat removal. It should be understood that the invention is not limited to a particular bus bar configuration. For example, the invention may use a multi-layer bus bar configuration such as that described and illustrated in co-assigned U.S. patent application Ser. No. 14/203,874, filed 11 Mar. 2014, the disclosure of which is incorporated herein for any and all purposes. Alternately, the invention may use a non-stacking bus bar arrangement such as the configuration described and illustrated in co-assigned U.S. patent application Ser. No. 14/802,207, filed 17 Jul. 2015, the disclosure of which is incorporated herein for any and all purposes. To simplify the figures illustrating the invention, the battery interconnects and the battery mounts are not shown.

Figure 10:
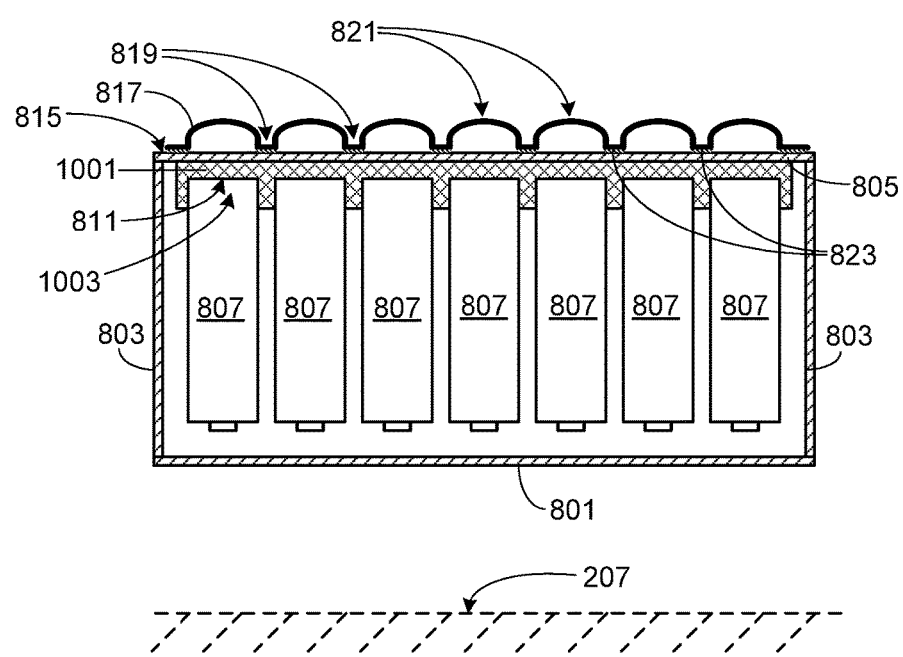
FIG. 10 provides a cross-sectional view of the embodiment shown in FIG. 8, modified to include a continuous layer of thermally conductive material within the battery pack.

In accordance with the invention, battery casing surface 811 of each battery 807 is thermally coupled to the flat battery pack enclosure panel (e.g., panel 805) with a layer 813 of a thermally conductive, electrically non-conductive material. Surface 811, which is comprised of a portion of the battery case (i.e., casing) is the uppermost surface of the battery and is opposite the end of the battery containing the cap assembly. Layer 813, which provides thermal communication between each of the batteries and pack enclosure panel 805, may be formed as a discontinuous layer such that each battery is thermally coupled to panel 805 by its own portion or region of layer 813 as shown. Alternately, this thermally conductive, electrically non-conductive layer may be formed as a continuous layer 1001 as shown in FIG. 10. Furthermore, this layer may only contact the uppermost surface 811 of the battery as exemplified in pack 800 of FIG. 8, or this layer may contact the uppermost surface 811 as well as upper battery portion 1003 as exemplified in pack 1000 of FIG. 10.

Layer 813 (and layer 1001) may be formed of any material that provides adequate thermal conductivity while providing the necessary levels of electrical isolation to prevent battery shorting. In at least one embodiment this layer is comprised of epoxy. Preferably layer 813 (and layer 1001) has a resistivity of at least $10^{12}$ ohm-cm and a thermal conductivity of at least 0.25 $Wm^{-1}K^{-1}$, and more preferably a thermal conductivity of at least 0.50 $Wm^{-1}K^{-1}$, and still more preferably a thermal conductivity of at least 0.75 $Wm^{-1}K^{-1}$. Although not required, in at least one embodiment of the invention, and as described in detail in co-pending and co-assigned U.S. patent application Ser. No. 14/331,300, filed 15 Jul. 2014, the disclosure of which is incorporated herein for any and all purposes, a plurality of electrically non-conductive granules, for example fabricated from alumina or silica, are dispersed within layer 813 (and/or layer 1001), where the granules have a higher melting point than the material comprising layer 813 (and layer 1001). As a result of the granules, even if the thermally conductive layer softens due to excessive heat, the granules help prevent the batteries from contacting enclosure panel 805, thereby preventing shorting if panel 805 is fabricated from an electrically conductive material (e.g., metal).

Panel 805 is fabricated from a thermally conductive material. Preferably panel 805 is fabricated from a metal such as aluminum with a thermal conductivity on the order of 100-200 $Wm^{-1}K^{-1}$, or an iron alloy such as a carbon steel with a thermal conductivity on the order of 40-60 $Wm^{-1}K^{-1}$ or stainless steel with a thermal conductivity on the order of 15-20 $Wm^{-1}K^{-1}$. Panel 805, more specifically the inner surface relative to the battery pack, may include a thin layer of an electrically non-conductive material, i.e., an isolation layer, thereby providing further protection from battery shorting in the event of excessive heating causing layer 813 (or layer 1001) to soften and fail. If panel 805 is fabricated from aluminum, in at least one embodiment it is anodized in order to create an electrically non-conductive layer.

Figure 11:
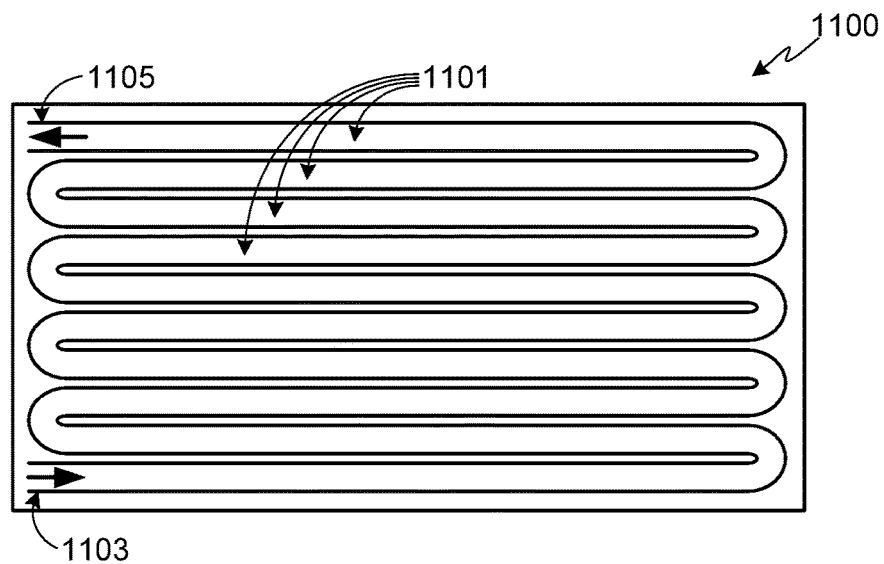
FIG. 11 is a top view of battery pack shown in FIG. 8, this view showing the pattern of coolant conduits formed in the top panel.
Figure 12:
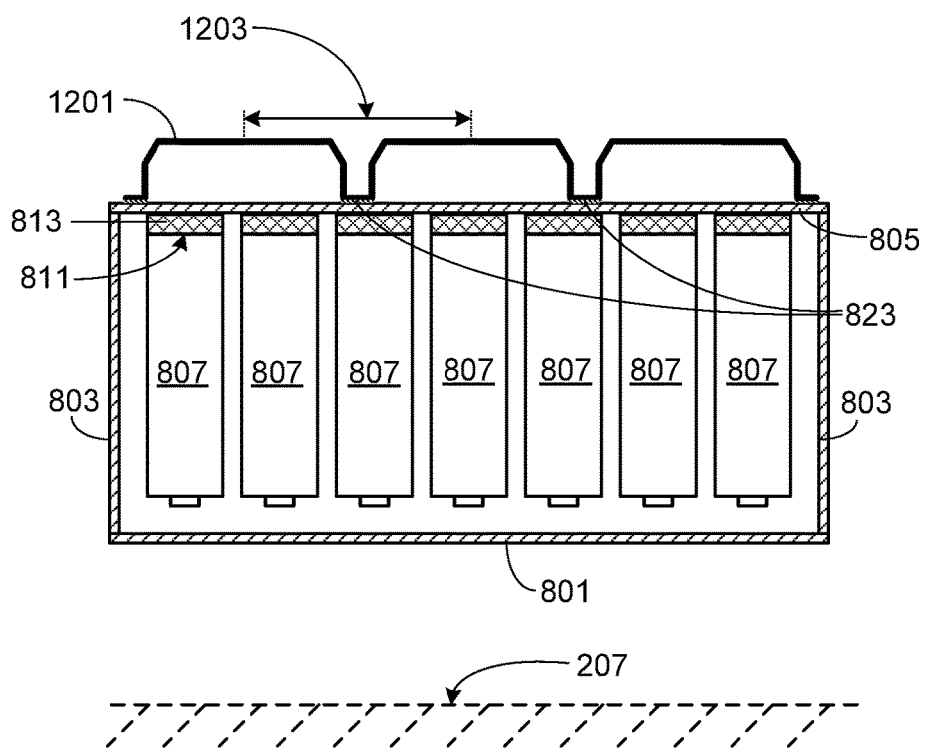
FIG. 12 provides a cross-sectional view of the embodiment shown in FIG. 8 utilizing a conduit panel with a different cross-section and channel pitch.

Attached to the outer surface of enclosure panel 805, i.e., surface 815, is a conduit panel 817 that serves as the outer surface of the cooling conduit structure. Panel 817 may be fabricated using a stamping process or any other technique that is capable of generating the desired pattern in the selected material (e.g., aluminum, iron alloy such as carbon steel or stainless steel, etc.). The portion of conduit panel 817 shown in the cross-sectional view of FIG. 8 is comprised of a corrugated structure. The corrugated structure provides both mounting surfaces 819 and coolant channels 821, where mounting surfaces 819 may be welded, brazed, soldered, or bonded to surface 815 of panel 805. In FIG. 8, joint 823 is indicative of this attachment juncture (i.e., a weld joint, braze joint, solder joint or bonding joint). FIG. 11 is a top view of a conduit panel 1100, similar to panel 817 except for the number of conduits channels 1101. A thermal transfer medium, also referred to herein as a coolant, is pumped through the channels formed by the conduit panel and the underlying enclosure panel (e.g., panel 805) with the coolant entering through conduit input 1103 and exiting via conduit output 1105. It should be understood that the conduit panel of the invention is not limited to a specific channel shape or channel configuration. For example, FIG. 12 illustrates an alternate cross-sectional channel shape in a conduit panel 1201 that includes a different pitch (i.e., channel spacing 1203).

Figure 13:
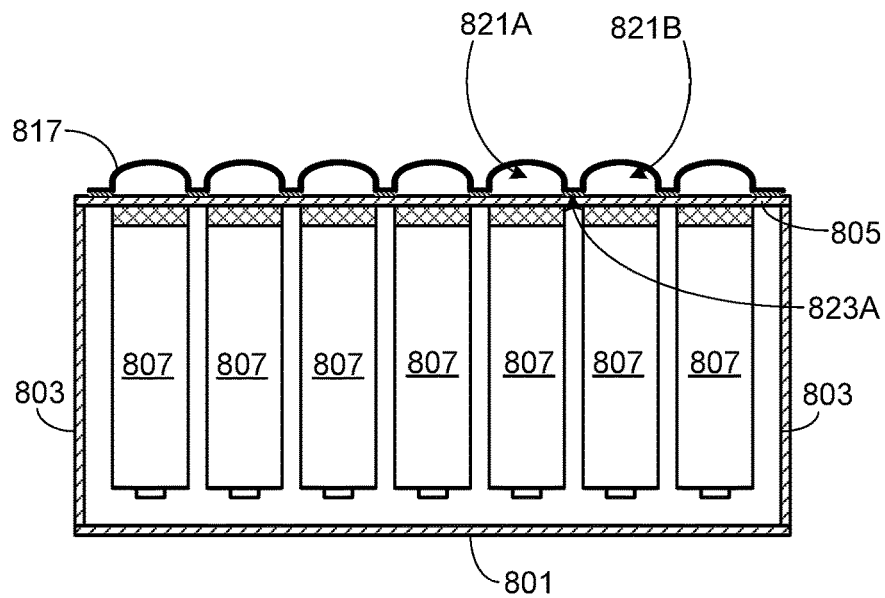
FIG. 13 provides a cross-sectional view of the embodiment shown in FIG. 8, this view illustrating the effects of a small leak between the battery pack enclosure panel and the conduit panel.

A coolant conduit structure in accordance with the invention and as described above offers a number of significant advantages over a conventional battery cooling system such as those shown in FIGS. 2 and 3. Firstly, if the conduit structure leaks, the leaking coolant cannot enter the battery pack and therefore cannot short or otherwise damage the batteries and internal battery pack components (e.g., interconnects, fuse assembly, etc.). Therefore the risk of damaging the battery pack, one of the most expensive components in an EV, is significantly reduced. Secondly, many types of conduit leaks, such as those occurring at a juncture between the conduit panel (e.g., panel 817, panel 1100, panel 1201, etc.) and the underlying panel (e.g., pack enclosure panel 805), will be of minor consequence if they only cause a small amount of coolant to bypass a portion of the cooling system. For example and as illustrated in FIG. 13, a leak occurring at junction 823A will simply cause fluid to flow between coolant channels 821A and 821B, thereby causing minimal degradation in thermal control efficiency. Furthermore, a leak such as that described above and illustrated in FIG. 13 will typically not even require immediate repair. In contrast, a similarly sized leak occurring within an internally mounted cooling conduit (e.g., conduit 209 in FIG. 2 or conduit 301 in FIG. 3) would require immediate and costly repair. Thirdly, when a cooling conduit does require repair, for example due to a leak on an external surface of the conduit panel, the repair can be performed without requiring the complete disassembly of the battery pack. Rather, the conduit repair can be accomplished by simply replacing the battery enclosure panel 805 and the attached conduit panel (e.g., panel 817). Fourthly, since the cooling conduits are externally mounted, the battery pack complexity is dramatically reduced, thereby reducing manufacturing time and cost.

As noted above, panel 805 is preferably fabricated from a metal such as aluminum or steel (e.g., carbon steel, stainless steel, etc.). Aluminum provides superior thermal conductivity, thus efficiently conducting the heat from the batteries to the coolant within the channels (e.g., channels 821) of the conduit panel as well as effectively spreading the heat between batteries and helping to prevent hot spots. Steel, due to its higher melting point, provides a more effective barrier between the battery pack and the passenger cabin in the event of a battery undergoing thermal runaway. Accordingly, in at least one preferred embodiment either the upper enclosure panel (e.g., panel 805) or the conduit panel (e.g., panel 817, panel 1201) or both is fabricated from steel.

In a modification of the embodiment described above, and as illustrated in FIG. 14, a three layer design may also be used for the thermal management system. This embodiment is similar to that described above, except for the inclusion of a secondary panel interposed between the battery pack enclosure panel and the conduit panel. The use of a three layer design allows the cooling panel structure, as a whole, to be removed without opening the battery pack. Therefore as a result of this design configuration, the initial vehicle fabrication costs may be reduced as well as those costs associated with vehicle maintenance, thereby reducing the cost of ownership.

Figure 14:
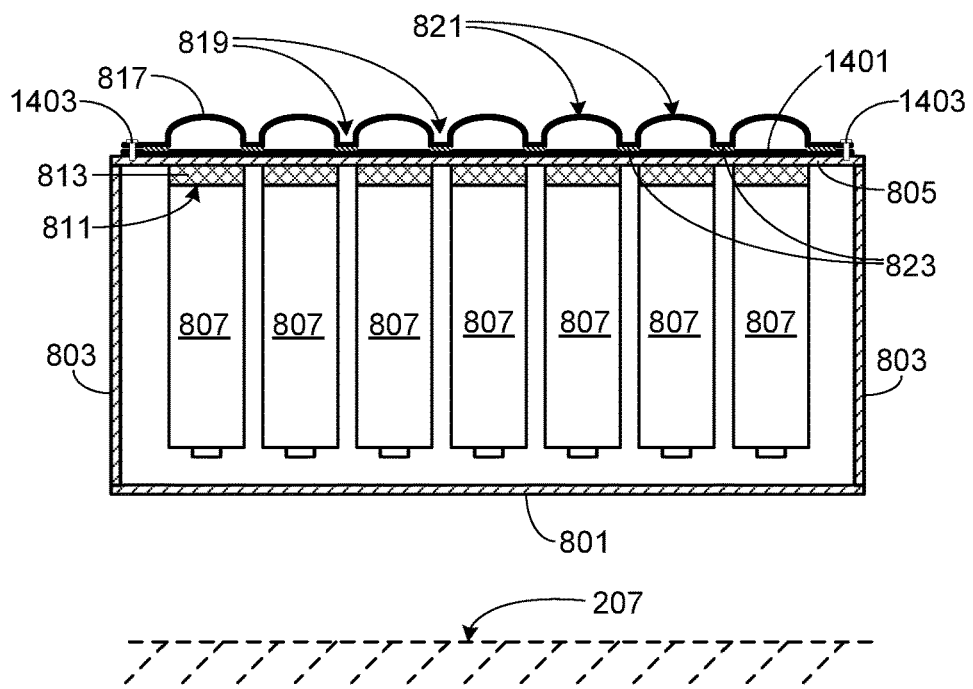
FIG. 14 provides a cross-sectional view of an embodiment similar to that shown in FIG. 8 except for the inclusion of an additional layer between the upper battery pack enclosure panel and the conduit panel.
Figure 15:
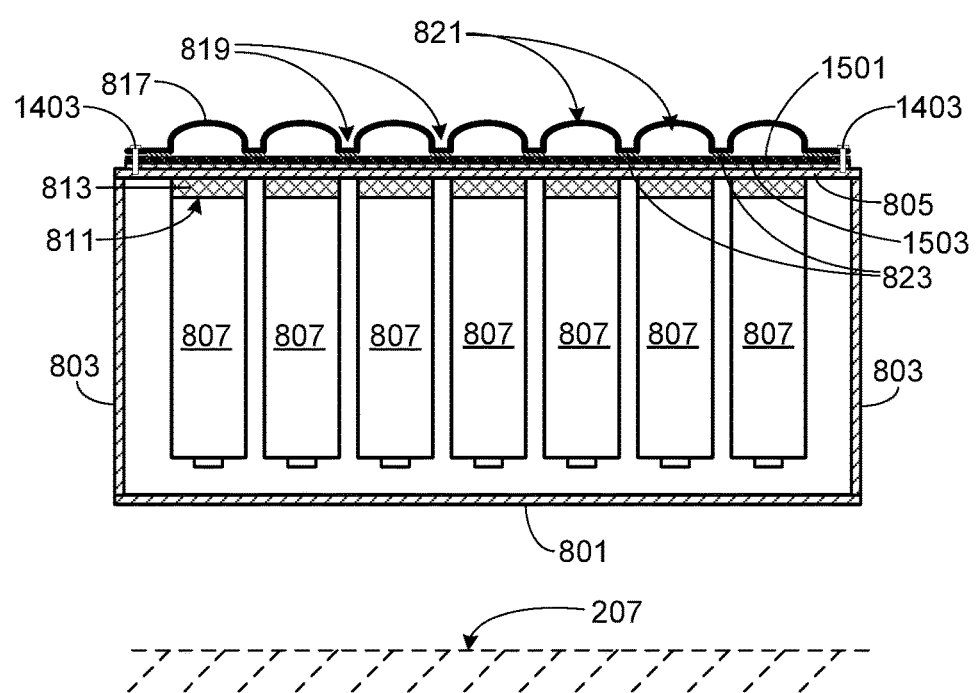
FIG. 15 provides a cross-sectional view of an embodiment similar to that shown in FIG. 8 except for the inclusion of two additional layers between the upper battery pack enclosure panel and the conduit panel.

As shown in FIG. 14, interposed between upper battery pack enclosure panel 805 and conduit panel 817 is a secondary flat panel 1401. The conduit panel, which may utilize any coolant channel cross-section or configuration as noted above, is attached via mounting surfaces 819 to secondary panel 1401 via a weld joint, braze joint, solder or bonding material 823. While panel 1401 may be welded, brazed, soldered or bonded to the upper battery pack enclosure panel (e.g., panel 805), preferably it is attached via a technique such as clips or bolts (e.g., bolts 1403) that allow the easy removal and replacement of the conduit structure from the battery pack. In at least one embodiment, a thermal compound (e.g., grease, paste or gel) is interposed between panel 1401 and upper battery pack enclosure panel 805, thereby improving heat transfer between the battery pack and the cooling conduits.

In order to achieve the desired level of performance and manufacturability, several constraints are placed on the upper battery pack enclosure panel, the secondary panel, and the conduit panel. For example, the materials comprising the upper battery pack enclosure panel (e.g., panel 805) and the interposed panel (e.g., panel 1401) must be thermally conductive in order to insure adequate transfer of heat from the batteries to the coolant within the channels of the conduit panel. Furthermore, one or more of the three panels is preferably fabricated from steel, thereby providing a fire protection layer that insures adequate passenger protection from any thermal runaway events that occur within the battery pack. Additionally, the conduit panel (e.g., panel 817) must be fabricated from a material that can be attached to the interposed panel (e.g., panel 1401) by the desired attachment means (e.g., welding, brazing, etc.). In light of these requirements, in one preferred configuration the upper battery pack enclosure panel is fabricated from aluminum while both the conduit panel and the interposed panel are fabricated from an iron alloy (e.g., carbon steel, stainless steel, etc.). In an alternate configuration, the upper battery pack enclosure panel is fabricated from an iron alloy (e.g., carbon steel, stainless steel, etc.) while both the conduit panel and the interposed panel are fabricated from aluminum. In yet another configuration, the upper battery pack enclosure panel and the conduit panel are fabricated from an iron alloy while the interposed panel is fabricated from aluminum. In yet another configuration, the upper battery pack enclosure panel and the conduit panel are fabricated from aluminum while the interposed panel is fabricated from an iron alloy. The last two configurations help to offset the bimetallic effect, although they require that the conduit panel be attached to a panel of a dissimilar material.

In order to provide further optimization, the inventors have found that in some instances a four layer design is preferable. As in the prior embodiments, each of the layers interposed between the batteries and the coolant is fabricated from a thermally conductive material, preferably a metal such as aluminum or an iron alloy. Given the need for a thermally conductive material, and given that weight is a principal concern in an EV where increased weight translates to reduced performance and range, aluminum is an ideal candidate for the structure. However, and as previously noted, due to its higher melting point steel provides a more effective fire barrier than aluminum in the event of a battery undergoing thermal runaway. Accordingly in at least one preferred embodiment, at least one of the layers is comprised of an iron alloy such as carbon steel or stainless steel. An additional concern, regardless of the embodiment, is the coolant channel seal between the conduit panel and the adjacent panel. In addition to being a high quality seal, preferably it is fabricated using a rapid and inexpensive technique such as laser welding. The inventors have found that these goals are best achieved when using similar materials for the conduit panel and the immediately adjacent panel (e.g., an aluminum-aluminum interface or a steel-steel interface).

To achieve the above design goals, in a preferred four layer design that optimizes thermal performance and weight, both conduit panel 817 and adjacent panel 1501 are fabricated from aluminum. In addition, in this design enclosure panel 805 and secondary panel 1501 are fabricated from the same material, i.e., aluminum. A tertiary panel 1503, interposed between enclosure panel 805 and secondary panel 1501, is fabricated from an iron alloy (e.g., carbon steel or stainless steel). Thus this design allows easy removal and/or replacement of the conduit structure, the use of simple fabrication techniques (e.g., welding) for the conduit structure, and the inclusion of a fire protection layer, all in a relatively low weight structure. It should be understood, however, that the four layer design of the invention may utilize other material combinations. For example, in an alternate configuration upper enclosure panel 805, conduit panel 817 and secondary panel 1501 are all fabricated from steel while tertiary panel 1503 is fabricated from aluminum.

Regardless of the materials selected for each of the panels in the four layer design, preferably a thermal compound (e.g., thermal grease, paste or gel) is interposed between panels 805 and 1503, and interposed between panels 1503 and 1501, thereby improving heat transfer.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A battery pack thermal management assembly, comprising:
   a plurality of batteries, each battery of said plurality of batteries comprising a first terminal at a first end portion of said battery and a second terminal at said first end portion of said battery;
   a sealed battery pack enclosure configured to contain said plurality of batteries, said sealed battery pack enclosure comprising a lower enclosure panel, a plurality of enclosure side panels, and an upper enclosure panel, and wherein said upper enclosure panel is comprised of a thermally conductive material;
   a secondary panel, wherein a first surface of said secondary panel is proximate to an external surface of said upper enclosure panel, wherein said secondary panel is thermally coupled to said upper enclosure panel, and wherein said secondary panel is attached to said upper enclosure panel;
   a conduit panel, wherein at least a portion of said conduit panel in cross-section exhibits a corrugated structure, said corrugated structure comprising a plurality of mounting surfaces and a plurality of channels, said conduit panel attached to a second surface of said secondary panel at a plurality of attachment junctures, wherein at least a portion of said plurality of attachment junctures are formed between said second surface of said secondary panel and said plurality of mounting surfaces, wherein said plurality of attachment junctures form a coolant channel seal, wherein said conduit panel and said secondary panel comprise a cooling panel structure, said cooling panel structure further comprising a coolant channel, said coolant channel defined by said second surface of said secondary panel and an inner surface of said plurality of channels of said corrugated structure of said conduit panel; and
   a layer of thermally conductive material, wherein said layer of thermally conductive material is electrically insulative, wherein said layer of thermally conductive material contacts and is thermally coupled to at least an upper surface of each battery of said plurality of batteries, wherein said upper surface of each battery is distal from said first end portion of each battery, and wherein said layer of thermally conductive material is interposed between said upper surface of each battery of said plurality of batteries and an internal surface of said upper enclosure panel.

2. The battery pack thermal management assembly of claim 1, wherein said cooling panel structure is attached to said upper enclosure panel via a temporary means of attachment selected from the group consisting of bolts and clips.

3. The battery pack thermal management assembly of claim 1, wherein said cooling panel structure is attached to said upper enclosure panel using a technique selected from welding, brazing, soldering and bonding.

4. The battery pack thermal management assembly of claim 1, further comprising a layer of a thermal compound interposed between said first surface of said secondary panel and said external surface of said upper enclosure panel.

5. The battery pack thermal management assembly of claim 4, wherein said thermal compound is selected from the group consisting of thermal greases, thermal pastes and thermal gels.

6. The battery pack thermal management assembly of claim 1, wherein said sealed battery pack enclosure is mounted to a vehicle, wherein said first end portion of each battery of said plurality of batteries is in close proximity to said lower enclosure panel, wherein said lower enclosure panel is adjacent to a road surface, and wherein said upper surface of each battery of said plurality of batteries is in close proximity to said internal surface of said upper enclosure panel.

7. The battery pack thermal management assembly of claim 6, wherein each battery of said plurality of batteries utilizes a cylindrical form factor, and wherein said plurality of batteries are positioned within said sealed battery pack enclosure such that a cylindrical axis corresponding to each battery of said plurality of batteries is substantially perpendicular to said lower enclosure panel.

8. The battery pack thermal management assembly of claim 7, wherein said coolant channel is positioned such that a coolant within said coolant channel flows within a plane that is substantially perpendicular to said cylindrical axis corresponding to each of said plurality of batteries.

9. The battery pack thermal management assembly of claim 1, wherein said plurality of attachment junctures are fabricated using a technique selected from welding, brazing, soldering and bonding.

10. The battery pack thermal management assembly of claim 1, wherein said plurality of attachment junctures are comprised of at least one of a weld joint, a braze joint, a solder joint and a bonding joint.

11. The battery pack thermal management assembly of claim 1, wherein said external surface of said upper enclosure panel is flat, and wherein said first and second surfaces of said secondary panel are flat.

12. The battery pack thermal management assembly of claim 1, further comprising:
a heat transfer medium contained within said coolant channel; and
a circulation pump configured to pump said heat transfer medium through said coolant channel.

13. The battery pack thermal management assembly of claim 1, wherein said layer of thermally conductive material is discontinuous and comprised of a plurality of thermally conductive material regions, wherein said plurality of thermally conductive material regions correspond to said plurality of batteries.

14. The battery pack thermal management assembly of claim 1, wherein said layer of thermally conductive material contacts and is thermally coupled to a second end portion of each battery of said plurality of batteries, wherein said second end portion of each battery is distal from said first end portion of each battery.

15. The battery pack thermal management assembly of claim further comprising a plurality of granules dispersed throughout said layer of thermally conductive material, wherein a first melting point corresponding to said plurality of granules is higher than a second melting point corresponding to said layer of thermally conductive material.

16. The battery pack thermal management assembly of claim 1, wherein said upper enclosure panel is fabricated from a metal selected from the group consisting of aluminum and iron alloys.

17. The battery pack thermal management assembly of claim 1, wherein said upper enclosure panel has a thermal conductivity of at least 15 $Wm^{-1}K^{-1}$.

18. The battery pack thermal management assembly of claim 17, wherein said upper enclosure panel has a thermal conductivity of at least 40 $Wm^{-1}K^{-1}$.

19. The battery pack thermal management assembly of claim 18, wherein said upper enclosure panel has a thermal conductivity of at least 100 $Wm^{-1}K^{-1}$.

20. The battery pack thermal management assembly of claim 1, wherein said secondary panel is fabricated from a metal selected from the group consisting of aluminum and iron alloys.

21. The battery pack thermal management assembly of claim 1, wherein said secondary panel has a thermal conductivity of at least 15 $Wm^{-1}K^{-1}$.

22. The battery pack thermal management assembly of claim 21, wherein said secondary panel has a thermal conductivity of at least 40 $Wm^{-1}K^{-1}$.

23. The battery pack thermal management assembly of claim 22, wherein said secondary panel has a thermal conductivity of at least 100 $Wm^{-1}K^{-1}$.

24. The battery pack thermal management assembly of claim 1, wherein said conduit panel is fabricated from a metal selected from the group consisting of aluminum and iron alloys.

25. The battery pack thermal management assembly of claim 1, wherein said layer of thermally conductive material has a resistivity of at least $10^{12}$ ohm-cm and a thermal conductivity of at least 0.25 $Wm^{-1}K^{-1}$.

26. The battery pack thermal management assembly of claim 25, wherein said thermal conductivity of said layer of thermally conductive material is greater than 0.75 $Wm^{-1}K^{-1}$.

27. The battery pack thermal management assembly of claim 1, wherein said layer of thermally conductive material is comprised of an epoxy.

28. The battery pack thermal management assembly of claim 1, wherein said inner surface of said upper enclosure panel is coated with an isolation layer comprised of an electrically non-conductive material.

29. The battery pack thermal management assembly of claim 1, wherein said upper enclosure panel is fabricated from aluminum, and wherein said inner surface of said upper enclosure panel is anodized.

* * * * *